United States Patent [19]

Samejima

[11] 4,160,059
[45] Jul. 3, 1979

[54] ADSORPTIVE NONWOVEN FABRIC COMPRISING FUSED FIBERS, NON-FUSED FIBERS AND ABSORPTIVE MATERIAL AND METHOD OF MAKING SAME

[75] Inventor: Tadanori Samejima, Fuji, Japan

[73] Assignee: Honshu Seishi Kabushiki Kaisha, Tokyo, Japan

[21] Appl. No.: 908,922

[22] Filed: May 24, 1978

Related U.S. Application Data

[63] Continuation-in-part of Ser. No. 685,687, May 12, 1976, abandoned.

[51] Int. Cl.$^2$ .................. B32B 5/26; B32B 5/30; B32B 23/10; B32B 31/26
[52] U.S. Cl. ..................... 428/288; 19/301; 55/DIG. 5; 55/DIG. 16; 131/265; 131/266; 156/306; 210/502; 210/504; 210/505; 210/508; 428/296; 428/298; 428/303; 428/323; 428/329; 428/332
[58] Field of Search .................. 19/156.3; 55/DIG. 5, 55/DIG. 16; 131/265, 266; 156/306; 210/502, 504, 505, 508; 428/288, 296, 298, 303, 323, 329, 332

[56] References Cited

U.S. PATENT DOCUMENTS

| | | | |
|---|---|---|---|
| 2,527,628 | 10/1950 | Francis | 55/DIG. 5 |
| 2,881,770 | 4/1959 | Touey | 131/266 |
| 3,034,947 | 5/1962 | Conlisk et al. | 131/266 |
| 3,039,908 | 6/1962 | Pormele | 131/266 |
| 3,297,041 | 1/1967 | Sproull et al. | 131/266 |
| 3,313,665 | 4/1967 | Berger | 131/266 |
| 3,444,863 | 5/1969 | Soehngen et al. | 131/266 |
| 3,886,629 | 6/1975 | Nakai et al. | 19/156.3 |

*Primary Examiner*—J. C. Cannon
*Attorney, Agent, or Firm*—Frishauf, Holtz, Goodman & Woodward

[57] ABSTRACT

A novel adsorptive nonwoven fabric having good strength as well as good permeability and softness and a method of making the same is disclosed. This product consists essentially of supporting fibers containing a heat-fusible fiber and an adsorptive material, said supporting fibers being disintegrated in air before they are admixed with an adsorptive material, and a web is formed from the final mixture followed by being subjected to a heat treatment at a temperature above the melting point of said heat-fusible fiber to firmly fix said adsorptive material in the web by heat-fusion of the heat-fusible fiber.

28 Claims, 3 Drawing Figures

ADSORPTIVE NONWOVEN FABRIC COMPRISING FUSED FIBERS, NON-FUSED FIBERS AND ABSORPTIVE MATERIAL AND METHOD OF MAKING SAME

RELATED APPLICATION

This application is a continuation-in-part of application Ser. No. 685,687, filed May 12, 1976, and now abandoned.

This invention relates to an adsorptive nonwoven fabric and a method of making the same. More particularly, the invention relates to a novel adsorbent sheet of a nonwoven fabric produced by a dry process consisting essentially of (1) supporting fibers which consist of (a) a natural fiber and/or a synthetic fiber and (b) a heat-fusible fiber; and (2) an adsorptive material, characterized in that said adsorptive material is uniformly dispersed throughout and is firmly fixed in the sheet of said nonwoven fabric particularly by the bonding formed by heat fusion of said heat-fusible fiber.

Adsorptive materials such as active carbon, Japanese acid clay, active alumina, diatomaceous earth and the like have a wide variety of industrial and other uses because of their excellent adsorbing power generally based on their characteristic structure having a very large area of active surface. Active carbon, for example, has an active surface area per unit weight such as in the region of 800–1800 $m^2/g$ and is used for the purposes of decolorization and deodorization of materials in such industries as: sugar refining, brewing, production of sodium glutamate, oil and fat, and the like; recovery or collection of vapors of organic solvents; purification of gases; carrier for catalysts for the synthesis of vinyl chloride, vinyl acetate and the like; purification of tap water, and so on. Its use is further extending to fields such as the desulphurization of industrial waste waters and gases. Many other adsorptive materials are used for the same or similar purposes.

These adsorptive materials are generally used in powder or particulate form. For example, as gas or liquid is passed through a container filled with finely powdered adsorptive material to remove undesirable components therefrom. Alternatively, the gas or liquid is kept in contact with powdered or particulate adsorptive material for a predetermined period of time and then the adsorptive material is separated from the fluid.

The use of the adsorptive material in particulate form may be acceptable when large scale adsorption is to be effected in an industrial process, because in such case the reuse of the adsorptive material is generally contemplated. However, where a relatively small amount of the adsorptive material is required without any intention of reuse, such as in a "charcoal filter for cigarette", "deodorization filter for an air-conditioning apparatus", "filter for removing toxic gases" including a "mask" used in a workshop where various solvents are used or in a farm where agricultural chemicals are distributed, materials in powder form are not convenient to handle. If, for example, they can be fixed in the form of a soft, porous and flexible sheet without diminishing their characteristic properties, it will be very convenient, particularly for one-use purposes as mentioned above. For this reason, methods of fixing an adsorptive material in sheet form have been studied, and various useful methods have been developed. For example, one reported method is to make adsorptive paper by dispersing wood pulp in water, beating the pulp, then adding powdered active carbon to the beaten pulp before the mixture is fed to a paper machine for making paper therefrom. However, this type of wet process which requires water as dispersion medium has a defect in that since the bonding principally depends on the mutual entanglement of intermixed fibers, the sheet formed is usually a high density relatively stiff sheet, which is poor in permeability and softness and is not suitable for "filters". In addition, such wet process has another defect. That is, during drainage treatment, a substantial amount of the adsorptive material, particularly the finest particles, is wastefully carried out with water which drains through the mesh of the wire screen of the paper machine to leave the formed web on the wire screen. Thus, a substantial amount of the adsorptive material is lost as "white water" waste, which results in a substantial reduction in yield. A further disadvantage in connection with such wet process is that the distribution of the added adsorptive material on the right side surface often differs from that on the back side surface of the web.

Japanese Patent Public Disclosure No. 85857/1973 discloses a method of preparing adsorptive nonwoven fabric by a dry process. In this method, wood pulp disintegrated by a dry process is blended with active carbon and the blend is spread on the wire screen of a paper machine to form a web thereon, followed by spraying both surfaces of the web with an aqueous dispersion of a binding material such as latex, starch and the like before the web is dried to remove water and firmly fix the adsorptive material in the web thus prepared. However, when the adsorbent sheet material is produced by this method, it is inevitable that at least the exposed surface of the added adsorptive material becomes coated with a thin layer of the binding material. As a result, its adsorptive power will inevitably be diminished. Accordingly, though the permeability and softness of the sheet made by the latter method are improved due to the employment of a dry process, it has a defect in that the adsorptive power of the active carbon is inevitably diminished as a result of its active surface being covered with a thin film of the binding material.

The object of this invention is to eliminate such defects and provide a novel adsorbent sheet and a method of making the same which can ensure the economical production of adsorptive nonwoven fabrics through dry process. In this invention, air is used as a dispersing medium rather than water, so there is no substantial damage to the original adsorptive power of the adsorptive material nor to the permeability and softness usually ensured by a dry process nonwoven fabric production.

These and other objects of the present invention can be accomplished by the practice of the present invention as explained in detail below.

The method of the present invention comprises the steps of: shredding a natural cellulose fiber and/or a synthetic fiber in air; adding a heat-fusible fiber thereto and blending them with each other; feeding the blend to a disintegrator to form supporting fibers; adding thereto a predetermined amount of adsorptive material; pneumatically conveying the mixture to a web-forming machine to form a web; applying heated air to heat the web to a temperature above the melting point of the heat-fusible fiber to form firm bonds between the supporting fibers and the adsorptive material by heat fusion. The selective use of a certain solid binder and a specific manner of its application according to the present invention to a mixture of supporting fibers and an adsorptive material have successfully realized the production of the novel adsorptive nonwoven fabric of the present invention.

Figure 1:
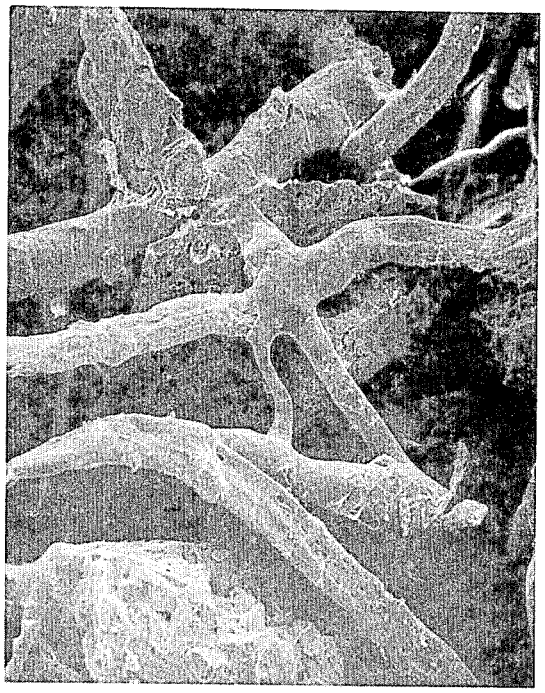
FIG. 1 shows an electron microscope photograph of the adsorptive nonwoven fabric of the present invention.

It is known that a bonding agent which wets well the surfaces of the substances to be bonded to each other will bring about a strong bond. Thus, it is reasonable that a bonding agent in the form of an aqueous dispersion or liquid binder is applied to a web formed by a dry process in the method of Japanese Patent Public Disclosure No. 85857/1973. However, when it is required to keep the active surface area of the adsorptive material as large as possible, as in the case of the present invention, in choosing the bonding agent it must be kept in mind that the wettability of the adsorptive material by said bonding agent is to be kept as low as possible. Hence, the problem to solve is how to get a strong bond using a binder which shows the least wettability when applied to the contacting surfaces.

The wetting ability of a material varies depending on a number of factors; two most important factors are surface tension and viscosity. The lower the surface tension, the more wettable the material, and the lower the viscosity, the better the fluidity, namely the larger the wettable area.

Most liquid binders have surface tension in the region of 20–70 dyne/cm at room temperature, while the surface tension of most solid binders in their molten state is in the region of 10–40 dyne/cm. Thus, it may be concluded that there is no significant difference between them in surface tension.

A liquid binder is generally applied to a nonwoven fabric by spraying, dipping and the like. Thus, its viscosity in the course of application is at most tens c.p. or so. This means that the binder shows good fluidity and easily spreads on the surface of fiber with the slightest application of external power.

In contrast, the viscosity of a solid binder even in its molten state is overwhelmingly greater than that of a liquid binder. The viscosity of high-pressure polyethylene, for example, is in the region of $10^4$–$10^5$ poises at 190° C. Thus, if this class of polymer can effectively be used as a solid binder for fixing powdered adsorptive material such as active carbon in a sheet such as a dry process nonwoven fabric, an improved adsorptive product in sheet form might be obtained without accompanying significant damage to the active surface of the adsorptive material. Based on such expectation, in this invention a heat-fusible fiber is used as a solid binder admixed with a main supporting fiber for making a dry-process nonwoven fabric in which an adsorptive material is fixed, said heat-fusible fiber constituting part of the supporting fibers too.

In the adsorptive nonwoven fabric of the present invention, the original characteristic properties of the adsorptive material are not substantially diminished, although a very small part of the surface area loses its activity as a result of being covered with a molten heat-fusible fiber. Accordingly, it is possible to choose the most suitable adsorptive material for a particular purpose and fix it in the sheet as an end product without spoiling the original properties of the adsorbent.

In the practice of the present invention, any adsorptive material can be used alone, or a mixture thereof, so long as they have active surface and a structure of a large surface area per unit weight. Representative examples include active carbon, Japanese acid clay, active alumina, diatomaceous earth and the like.

In this connection, it is emphasized that the art of the present invention can be applied not only to the production of the adsorptive nonwoven fabric but also to the production of similar sheet materials in which powder materials are fixed. For example, newly developed polymers having excellent swelling (or liquid-holding) ability such as cross-linked polyethylene oxide commercially available under the trademark of "Hydrogel" or "Viterra", starch polyacrylonitrile known as "SPAN" (available from C. P.), hydrolyzed starch polyacrylonitrile known as "HSPAN" (available from USDA) and the like, which are generally used in the form of powder, can conveniently be fixed in a sheet material according to the process of the present invention.

Useful heat-fusible fibers which can be used as a solid binder (and also as part of supporting fiber) in the practice of the present invention include any heat-fusible fibers which melt below the temperature at which a main supporting fiber begins to melt or change in any of its properties. Among these, high density polyethylene fiber having definite range of fiber length such as in the region of 0.8–1.5 mm and a melting point of about 131° C. is the most suitable. Other useful heat-fusible fibers include polypropylene fibers, polyvinyl chloride fibers and the like.

Fibers which can advantageously be used as a main supporting fiber in the practice of the present invention include any natural cellulose fibers and/or synthetic fibers such as, for example, wood pulp, linter, various kinds of non-wood plant fibers and the like.

In the practice of the present invention, 60–98% by weight of a main supporting fiber is mixed with 2–40% by weight of a heat-fusible fiber to provide supporting fibers.

Adsorptive material can be used in the region of 2–400, preferably in the region of 2–300, and most preferably in the region of 2–150% by weight based on the total amount of supporting fibers. But, this amount is not restrictive. So long as the sheet thus obtained has strength enough to bear any conceivable handling and has adsorptive power satisfactory for the end purpose, any amount of adsorptive material can be added to the original fiber mixture.

Figure 2:
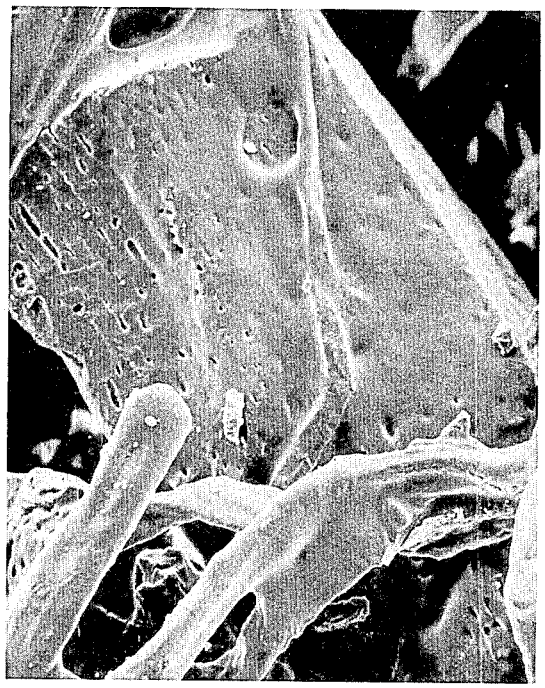
FIG. 2 shows an electron microscope photograph of a prior art adsorptive nonwoven fabric produced by a dry process using liquid binding agent.

FIG. 1 shows an electron microscope (scanning type, ×100) photograph of a novel adsorptive nonwoven fabric of the present invention (SWP of Mitsui-Zellerbach is used as a heat-fusible fiber), which clearly shows the improved structure of the adsorptive sheet product newly obtained according to the present invention. For comparison, an electron microscope photograph of a prior art adsorptive nonwoven fabric produced by a dry process using a liquid binding agent is shown in FIG. 2. It clearly shows that the surface of active carbon is covered with a thin layer of the binding agent applied thereto.

The following examples are included for a further understanding of this invention.

EXAMPLE 1

A web having basis weight of 200 g/m² and consisting of 60% by weight of active carbon (available from Takeda Chemical Industries, Ltd., under the trademark "Shirasagi"), 25% by weight of wood pulp and 15% by weight of synthetic wood pulp (available from Mitsui-Zellerbach under the trademark of "SWP E-790") was prepared by a dry process web-forming method. Then, the web was passed through a hot-air current type oven maintained at a temperature of 160° C. to cause heat fusion of the synthetic pulp. A soft, adsorptive nonwoven fabric having good porous structure and good strength was obtained. This nonwoven fabric was found to be suitable for use as a filter for an air-conditioning apparatus and a a filter for the adsorption of organic solvents.

In the practice of the present invention, a thin sheet such as tissue paper, nonwoven fabric and the like can be used advantageously between the web and the wire screen to ensure that the web does not stick to the wire screen in the source of or after the heat treatment of the web. This sheet provides a support for the web and improves the strength of the final product.

EXAMPLE 2

A web having basis weight of 130 g/m² and consisting of 60% by weight of active carbon (the same one as in Example 1), 25% by weight of wood pulp (the same one as in Example 1), 6.9% by weight of tissue paper (having basis weight of 9 g/m²) and 8.1% by weight of SWP E-790 (available from Mitsui-Zellerbach) was made by a dry web-forming method. This web was passed through a hot-air current type oven at 160° C. to make a web therefrom. The web was slit into predetermined width, from which a filter plug was made. This product was found to be an excellent charcoal filter for cigarettes.

EXAMPLE 3

Figure 3:
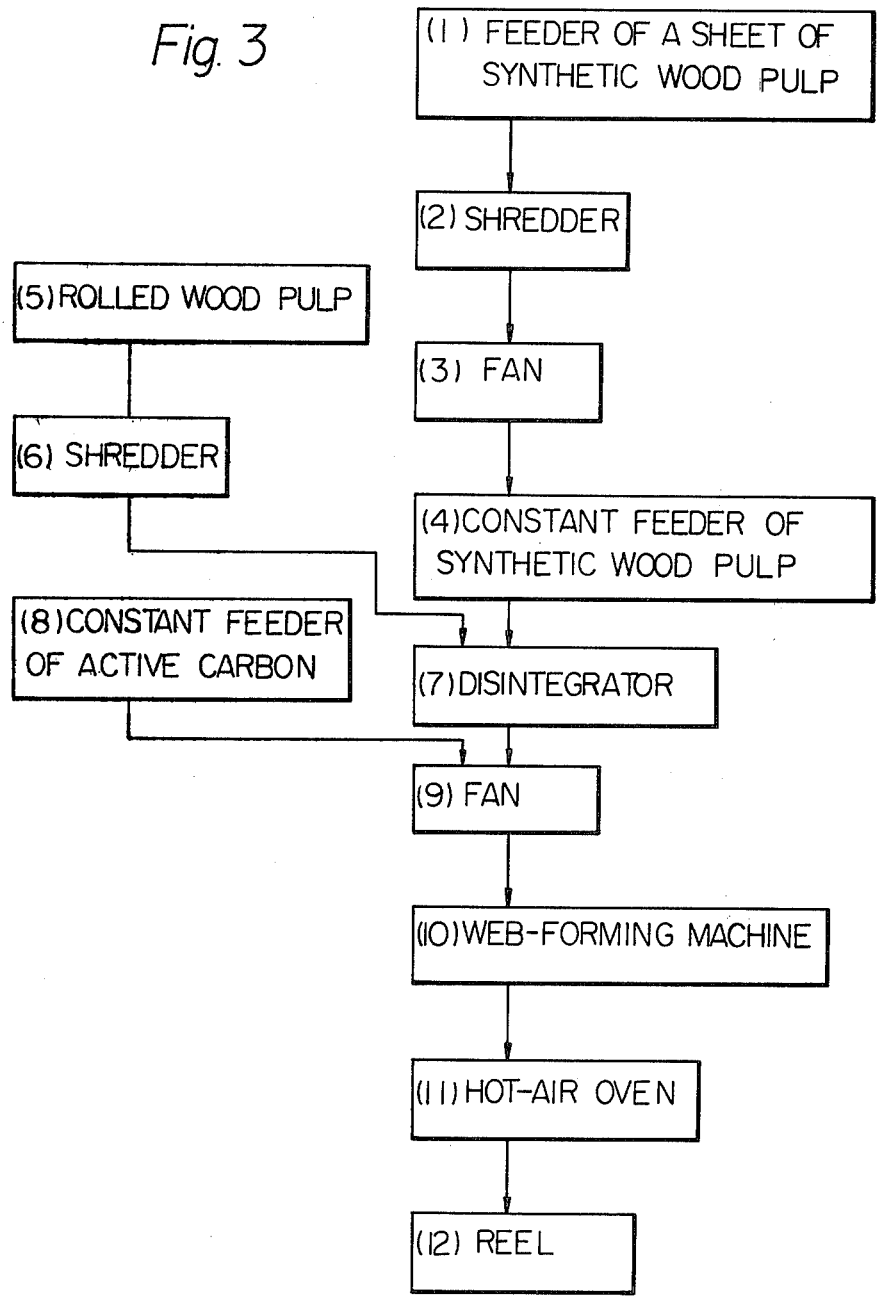
FIG. 3 shows an example of flow sheet for the production of the adsorptive nonwoven fabric of the present invention.

An example of a process for the production of the adsorbent sheet of the present invention is illustrated below referring particularly to FIG. 3 of the attached sheet.

Synthetic wood pulp in sheet form was fed by a feeder (1) to a shredder (2) to shred it into pieces having a cross-sectional area about 5 mm square. The, the shredded pieces were pneumatically conveyed by means of a fan (3) to a constant feeder of synthetic wood pulp (4) which ensured the constant feed of the synthetic wood pulp to a disintegrator (7). Rolled wood pulp (5) was fed to a pulp shredder (6) to be shredded into pieces having a cross-sectional area about 30 mm square and then mixed with the disintegrated synthetic wood pulp from the constant feeder (4). Then, the mixture was delivered to a disintegrator (7) where the mixture was subjected to disintegration together with a large amount of air to be disintegrated into single fibers. When fibers were passing through the narrow slit between the stator and rotor of the disintegrator together with a large amount of air, they were subjected to strong shock and shearing action caused by the rotor rotating at a high rate and thereby the fibers were separated into single fibers. The mixture of the disintegrated synthetic wood pulp and wood pulp passing through the disintegrator (7) was combined with active carbon fed from the active carbon constant feeder (8) and both were pneumatically conveyed to a web-forming machine (the machine disclosed in U.S. Pat. No. 3,886,629; FIGS. 1 and 2 can be used advantageously) by an air current caused by the fan (9). The web-forming machine, as is clear from said United States Patent, comprises a rotor like a hammer mill and a screen having openings about 4 mm in diameter. By the rotation of the rotor, fibers and active carbon were discharged from the screen through the openings onto a wire surface to form a web thereon. A suction box was placed under the wire to suck a large amount of air used for conveying the pulp and the adsorptive material. The web thus formed was then delivered into a hot air oven (11) to melt the synthetic pulp by heating with hot air to a temperature above the melting point of the heat-fusible fiber to bind the synthetic pulp and the active carbon firmly. The thicker the web, the more effective it is to use the oven of the type using hot air current. After passing through the oven (11), the web was cooled by air and was reeled up on a reel (12).

As illustrated in FIG. 1, the adsorptive material is firmly fixed in the web by said fusion. The adsorptive material is bonded (fixed) to the heat-fusible fibers substantially only at points of contact with the heat-fusible fibers. These contact points constitute only a very small part of the surface area of the adsorptive material. The uncontacted portions remain exposed and thereby retain their adsorptive properties. Similarly, the heat-fusible fibers, as a consequence of their fusion, are bonded to the supporting fibers only at point of contact therewith. These contact points constitute a small part of the surface area of the supporting fibers. Here also, uncontacted portions of the supporting fibers remain exposed and retain their properties.

I claim:

1. An adsorptive nonwoven fabric web comprising a support consisting of a thin sheet of paper or the like having superposed thereon an adsorptive layer, said adsorptive layer consisting essentially of (1) short-length supporting fibers which consist of a mixture of (a) a short-length natural cellulose main supporting fiber and (b) a short-length heat-fusible fiber; and (2) a powdered adsorptive material, said mixture having been disintegrated in air before it was joined in an air current by said adsorptive material added thereto to be pneumatically admixed and dispersed on a wire screen of a web-forming machine with said thin sheet interposed between said wire screen and the resulting mixture of said fibers and said adsorptive material to form a web on said wire screen, which web was subjected to heat treatment at a temperature above the melting point of said heat-fusible fiber in order to firmly fix the adsorptive material and the main supporting fiber in the web by fusion of at least part of said heat-fusible fiber, said adsorptive material being fixed to said heat-fusible fiber substantially only at points of contact between said heat-fusible fiber and adsorptive material such that all but a very small part of the surface area of the adsorptive material remains exposed, and said main supporting fiber being fixed in the web substantially only at points of contact between said heat-fusible fiber and said main supporting fiber such that all but a very small part of the surface area of said main supporting fiber remains exposed.

2. An adsorptive nonwoven fabric web as in claim 1 in which said supporting fibers comprise (a) 60–98% by weight of at least one of a natural cellulose fiber and a synthetic fiber, and (b) 2–40% by weight of a heat-fusible fiber.

3. An adsorptive nonwoven fabric web as in claim 2 in which said heat-fusible fiber is high density polyethylene having a melting point of about 131° C. and an average fiber length of 0.8–1.5 mm.

4. An adsorptive nonwoven fabric web as in claim 1 in which said adsorptive material is a member selected from the group consisting of active carbon, Japanese acid clay, diatomaceous earth and active alumina.

5. An adsorptive nonwoven fabric web as in claim 2 in which the amount of adsorptive material is 2–400% by weight based on the total weight of the supporting fibers.

6. An adsorptive nonwoven fabric web as in claim 2 in which the amount of adsorptive material is 2–300% by weight based on the total weight of the supporting fibers.

7. An adsorptive nonwoven fabric web as in claim 2 in which the amount of adsorptive material is 2–150% by weight based on the total weight of the supporting fibers.

8. A liquid-holding nonwoven fabric web comprising a support consisting of a thin paper of the like having superposed thereon a liquid-holding layer, said liquid-holding layer consisting essentially of (1) short-length supporting fibers which consist of a mixture of (a) a short-length natural cellulose fiber and (b) a short-length heat-fusible fiber; and (2) a liquid-holding or swelling material, said mixture having been disintegrated in air before it was joined in an air current by a liquid-holding or swelling material added thereto to be pneumatically admixed and dispersed on a wire screen of a web-forming machine with said thin sheet interposed between said wire screen and the resulting mixture of said fibers and said liquid-holding or swelling material to form a web on said wire screen, which web was subjected to heat treatment at a temperature above the melting point of said heat-fusible fiber in order to firmly fix the liquid-holding or swelling material in the web by fusion of at least part of said heat-fusible fiber, said liquid-holding or swelling material being fixed to said heat-fusible fiber substantially only at points of contact between said heat-fusible fiber and liquid-holding or swelling material such that all but a very small part of the surface area of the liquid-holding or swelling material remains exposed, and said main supporting fiber being fixed in the web substantially only at points of contact between said heat-fusible fiber and said main supporting fiber such that all but a very small part of the surface area of said main supporting fiber remains exposed.

9. A liquid-holding nonwoven fabric web as in claim 8 in which said supporting fibers comprise (a) 60–98% by weight of at least one of a natural cellulose fiber and a synthetic fiber, and (b) 2–40% by weight of a heat-fusible fiber.

10. A liquid-holding nonwoven fabric web as in claim 8 in which said heat-fusible fiber is high density polyethylene having a melting point of about 131° C. and an average fiber length of 0.8–1.5 mm.

11. A liquid-holding nonwoven fabric web as in claim 8 in which said liquid-holding material is a member selected from the group consisting of cross-linked polyethylene oxide, starch polyacrylonitrile and hydrolyzed starch polyacrylonitrile.

12. A liquid-holding nonwoven fabric web as in claim 8 in which the amount of liquid-holding material is 2–400% by weight based on the total weight of the supporting fibers.

13. A liquid-holding nonwoven fabric web as in claim 8 in which the amount of liquid-holding material is 2–300% by weight based on the total weight of the supporting fibers.

14. A liquid-holding nonwoven fiber web as in claim 8 in which the amount of liquid-holding material is 2–150% by weight based on the total weight of the supporting fibers.

15. A method of making an adsorptive nonwoven fabric web which comprises the steps of:
shredding a natural short-length cellulose fiber in air;
adding a short length heat-fusible fiber to said cellulose fiber to form a mixture;
feeding said mixture to a disintegrator to form disintegrated short-length supporting fibers;
adding a powdered adsorptive material to said disintegrated short-length supporting fibers;
pneumatically conveying said mixture containing said adsorptive material to a wire screen of a web-forming machine where it is formed into a web;
applying a thin sheet of paper or the like between said mixture containing said adsorptive material and said wire screen of said web-making machine;
applying heat to said mixture containing said adsorptive material to bring the temperature thereof above the melting point of said heat-fusible fibers to fix said adsorptive material in the web by heat fusion via said heat-fusible fibers, resulting in said adsorptive material being fixed to said heat-fusible fiber substantially only at points of contact between said heat-fusible fiber and adsorptive material such that all but a very small part of the surface area of the adsorptive material remains exposed, and said main supporting fiber being fixed in the web substantially only at points of contact between said heat-fusible fiber and said main supporting fiber such that all but a very small part of the surface area of said main supporting fiber remains exposed.

16. A method as in claim 15 in which said supporting fibers comprise (a) 60–98% by weight of at least one of a natural cellulose fiber and a synthetic fiber, and (b) 2–40% by weight of a heat-fusible fiber.

17. A method as in claim 15 in which the heat-fusible fiber is high density polyethylene having a melting point of about 131° C. and an average fiber length of 0.8–1.5 mm.

18. A method as in claim 15 in which the adsorptive material is a member selected from the group consisting of active carbon, Japanese acid clay, active alumina and diatomaceous earth.

19. A method as in claim 15 in which the amount of an adsorptive material used is 2–400% by weight based on the total amount of the supporting fibers.

20. A method as in claim 15 in which the amount of the adsorptive material used is 2–300% by weight based on the total amount of the supporting fibers.

21. A method as in claim 15 in which the amount of an adsorptive material used is 2–150% by weight based on the total amount of the supporting fibers.

22. A method of making a liquid-holding nonwoven fabric web which comprises the steps of:
shredding a short-length natural cellulose fiber in air;
adding a short-length heat-fusible fiber to said cellulose fiber to form a mixture;
feeding said mixture to a disintegrator to form disintegrated short-length supporting fibers;
adding a liquid-holding or swelling material to said disintegrated short-length supporting fibers;

pneumatically conveying said mixture containing said liquid-holding or swelling material to a web-forming machine where it is formed into a web;

applying a thin sheet of paper or the like between said mixture containing said material and said wire screen of said web-making machine;

applying heat to said mixture containing said material to bring the temperature thereof above the melting point of said heat-fusible fibers to fix said material in the web by heat fusion via said heat-fusible fibers, resulting in said liquid-holding or swelling material being fixed to said heat-fusible fiber substantially only at points of contact between said heat-fusible fiber and liquid-holding or swelling material such that all but a very small part of the surface area of the liquid-holding or swelling material remains exposed, and said main supporting fiber being fixed in the web substantially only at points of contact between said heat-fusible fiber and said main supporting fiber such that all but a very small part of the surface area of said main supporting fiber remains exposed.

23. A method as in claim 21 in which said supporting fibers comprise (a) 60–98% by weight of at least one of a natural cellulose fiber and a synthetic fiber, and (b) 2–40% by weight of a heat-fusible fiber.

24. A method as in claim 21 in which the heat-fusible fiber is high-density polyethylene having a melting point of about 131° C. and an average fiber length of 0.8–1.5 mm.

25. A method as in claim 21 in which the liquid-holding material is a member selected from the group consisting of cross-linked polyethylene oxide, starch polyacrylonitrile and hydrolyzed starch polyacrylonitrile.

26. A method as in claim 21 in which the amount of liquid-holding material used is 2–400% by weight based on the total amount of the supporting fibers.

27. A method as in claim 21 in which the amount of liquid-holding material used is 2–300% by weight based on the total amount of the supporting fibers.

28. A method as in claim 21 in which the amount of liquid-holding material used is 2–150% by weight based on the total amount of the supporting fibers.

* * * * *